United States Patent
Kim (10) Patent No.: US 11,981,068 B2
(45) Date of Patent: May 14, 2024

(54) PLASTIC SHEET SUPPLYING APPARATUS FOR THERMOFORMING MACHINE HAVING ADJUSTABLE PIN

(71) Applicant: GUNYANG ITT CO., LTD., Busan (KR)

(72) Inventor: Taek Hyun Kim, Busan (KR)

(73) Assignee: GUNYANG ITT CO., LTD. (KR)

( * ) Notice: Subject to any disclaimer, the term of this patent is extended or adjusted under 35 U.S.C. 154(b) by 852 days.

(21) Appl. No.: 16/999,266

(22) Filed: Aug. 21, 2020

(65) Prior Publication Data
US 2020/0376737 A1 Dec. 3, 2020

Related U.S. Application Data

(63) Continuation of application No. PCT/KR2018/010453, filed on Sep. 7, 2018.

(30) Foreign Application Priority Data
Aug. 20, 2018 (KR) .................. 10-2018-0096850

(51) Int. Cl.
*B29C 51/46* (2006.01)
*B29C 51/26* (2006.01)
(Continued)

(52) U.S. Cl.
CPC ............ *B29C 51/46* (2013.01); *B29C 51/262* (2013.01); *B29C 51/421* (2013.01); *G05B 19/4155* (2013.01); *G05B 2219/37239* (2013.01)

(58) Field of Classification Search
CPC ..... B29C 51/46; B29C 51/262; B29C 51/421; G05B 19/4155; G05B 2219/37239
See application file for complete search history.

(56) References Cited

U.S. PATENT DOCUMENTS

2011/0003025 A1* 1/2011 Patel ............... B29C 51/10
425/504
2015/0072040 A1* 3/2015 Kim ............... B29C 31/10
425/403.1

FOREIGN PATENT DOCUMENTS

JP 08-258168 A 10/1996
JP 11-221849 A 8/1999
(Continued)

OTHER PUBLICATIONS

International Search Report (PCT/KR2018/010453), WIPO, May 17, 2019.

*Primary Examiner* — Alison L Hindenlang
*Assistant Examiner* — Erica Hartsell Funk
(74) *Attorney, Agent, or Firm* — Park & Associates IP Law Office (57) ABSTRACT

A plastic sheet supplying apparatus for a thermoforming machine having an adjustable pin is proposed. Such a plastic sheet supplying apparatus for a thermoforming machine having an adjustable pin according to the present invention has the technical feature in which in a process in which a plastic sheet adhering to a material of a door trim is heated, fixing pins supporting a lower portion of an edge portion of the plastic sheet are configured to have adjustable positions so as to be moved in response to the change of the size of the plastic sheet caused by heating, so that the entire portion of the plastic sheet is uniformly heated and is also uniformly stretched without wrinkling, whereby the quality of a molded product is improved, and fabric consumption is reduced.

5 Claims, 10 Drawing Sheets

(51) Int. Cl.
  *B29C 51/42* (2006.01)
  *G05B 19/4155* (2006.01)

(56) References Cited

FOREIGN PATENT DOCUMENTS

| | | |
|---|---|---|
| JP | 2010-274388 A | 12/2010 |
| KR | 10-0837314 B1 | 6/2008 |
| KR | 10-1205878 B1 | 11/2012 |
| KR | 10-1334869 B1 | 11/2013 |
| KR | 10-1387026 B1 | 5/2014 |

\* cited by examiner

PLASTIC SHEET SUPPLYING APPARATUS FOR THERMOFORMING MACHINE HAVING ADJUSTABLE PIN

REFERENCE TO RELATED APPLICATIONS

This is a continuation of International Patent Application PCT/KR2018/010453 filed on Sep. 7, 2018, which designates the United States and claims priority of Korean Patent Application No. 10-2018-0096850 filed on Aug. 20, 2018, the entire contents of which are incorporated herein by reference.

FIELD OF THE INVENTION

The present invention relates generally to a plastic sheet supplying apparatus for a thermoforming machine having an adjustable pin. More particularly, the present invention relates to a plastic sheet supplying apparatus for a thermoforming machine having an adjustable pin, wherein in the process of heating plastic sheets adhering to various types of materials of a door trim, an instrument panel (IP), a dashboard, and a headliner, fixing pins supporting the lower portions of the edge portions of each of the plastic sheets are embodied to have adjustable positions.

BACKGROUND OF THE INVENTION

A thermoforming machine is a device used to manufacture interior parts of a vehicle such as a door trim, instrument panel, dashboard, headliner, carpet, and luggage board, etc. Particularly, various techniques used to adhere a plastic sheet to the surface of a material such as the door trim or the instrument panel of a vehicle have been developed.

Generally, as for the door trim or the instrument panel of a vehicle, in a molding apparatus, a hard material molded into a predetermined shape is placed on a lower mold; a plastic sheet heated by a heating device is placed on the hard material; an upper mold is lowered toward the plastic sheet, and the plastic sheet is compressed there between to be formed. Furthermore, the size of the plastic sheet is determined according to the size of the material.

However, when the plastic sheet is heated and lengthened by the heating device, the size of the plastic sheet is increased. In this case, if a device supporting the plastic sheet at a lower part thereof is fixed, the plastic sheet lengthened by the heating becomes useless, and a plastic sheet which exceeds the size of the material is discarded as scrap. Normally, a plastic sheet is expensive, so manufacturing cost is increased as the amount of the plastic sheet discarded increases. In addition, when a plastic sheet is lengthened, the plastic sheet sags downward, so that it is difficult to uniformly heat the entirety of the plastic sheet, and the plastic sheet has wrinkles occurring during the formation thereof, and becomes defective.

Accordingly, even in a prior art, a device adjusting clamps installed along the edge of a plastic sheet is used in order to make the plastic sheet lengthened by heat taut. However, the device adjusting the clamps a surface of the edge of the plastic sheet in a bundle, so a slack plastic sheet can be stretched in opposite directions. However, the slack plastic sheet cannot be stretched in directions orthogonal to the opposite directions. That is, the adjustment of interval between each clamp is impossible, so the entire surface of the slack plastic sheet cannot be uniformly stretched. Accordingly, the effect of saving the plastic sheet is low, and it is also difficult to improve the quality of a molded product of the thermoforming machine due to the ununiformed stretching of the entirety of the plastic sheet.

In relation to such a plastic sheet supplying apparatus for a thermoforming machine, "Apparatus of transferring skin cover for vacuum forming machine" in Korean Patent No. 10-0837314, "Apparatus of transferring skin cover for thermoforming machine with moving clamp" in Korean Patent No. 10-1205878, and "Apparatus of transferring skin cover for thermoforming machine with adjustable clamp" in Korean Patent No. 10-1334869 have been applied by the applicant of the present invention.

However, according to such a plastic sheet supplying apparatuses for a thermoforming machine, in the entire supplying process of a plastic sheet, the plastic sheet is moved while being fixed to clamps, and thus interference between components that clamp and transfer the plastic sheet may occur, whereby the driving stability and efficiency of the apparatus is decreased. To prevent this, the configuration of the apparatus becomes complicated.

SUMMARY OF THE INVENTION

Accordingly, the present invention has been made keeping in mind the above problems occurring in the prior art, and is intended to propose a new type of a plastic sheet supplying apparatus for a thermoforming machine having an adjustable pin, wherein fixing pins supporting a plastic sheet at a lower side thereof and fixing the plastic sheet in horizontal arrangement are allowed to be moved to the outside in response to the sagging of a plastic sheet or the change of a size thereof caused by heating, so that the entire portion of the plastic sheet maintains a flat state without sagging, whereby the plastic sheet is uniformly heated and the entire portion thereof is uniformly stretched. Accordingly, the quality of a molded product is improved, and fabric consumption is reduced. Furthermore, in the process of clamping and transferring the plastic sheet, interference between components is prevented, so the driving stability and efficiency of the apparatus are increased, and due to the simplified configuration of the apparatus, durability of the apparatus is improved, and manufacturing cost thereof is reduced.

According to the features of the present invention in order to accomplish the above objectives, the present invention provides a plastic sheet supplying apparatus for a thermoforming machine having an adjustable pin, the apparatus adhering a plastic sheet to a material, the apparatus including: a position adjustable pin fixing unit having a plurality of fixing pins arranged perpendicularly to edge portions of a plastic sheet, each of the fixing pins supporting the plastic sheet at a lower side thereof received from the outside to fix the plastic sheet in a state of a horizontal arrangement, and being moved in response to sagging of the plastic sheet or change of a size thereof caused by heating; a plastic sheet heating unit arranged at a preset position, and heating the plastic sheet fixed to the position adjustable pin fixing unit; and a controller controlling operations of the position adjustable pin fixing unit and the plastic sheet heating unit.

In such a plastic sheet supplying apparatus for a thermoforming machine having an adjustable pin according to the present invention, the position adjustable pin fixing unit may include two left-and-right-column fixing pin lines on edge portions of the plastic sheet located at left and right sides of width directions thereof, each of the left-and-right-column fixing pin lines having a structure in which the preset number of the fixing pins is linearly arranged, or may include two front-and-rear-row fixing pin lines on edge portions of the plastic sheet located at front and rear sides of longitudinal directions thereof, each of the front-and-rear-row fixing pin lines having a structure in which the preset number of the fixing pins is linearly arranged, or may include all of the left-and-right-column fixing pin lines and the front-and-rear-row fixing pin lines.

In such a plastic sheet supplying apparatus for a thermoforming machine having an adjustable pin according to the present invention, the position adjustable pin fixing unit may include: a link member having a structure in which multiple sticks are coupled to each other by hinges, each of the fixing pins being fixed to a portion at which the sticks cross each other in an X shape, and a link member actuator inducing a link movement of the link member and increasing a distance between the fixing pins in response to the sagging of the plastic sheet or the change of the size thereof caused by the heating, wherein the controller may generate an operation control signal for the link member actuator in response to a sagging amount of the plastic sheet or a changing amount of the size thereof, and control an operation of the link member actuator.

In such a plastic sheet supplying apparatus for a thermoforming machine having an adjustable pin according to the present invention, the position adjustable pin fixing unit may further include a sagging amount detection sensor detecting a present sagging amount of the plastic sheet, and the controller may include: a first memory unit temporarily storing the present sagging amount of the plastic sheet by receiving the present sagging amount thereof from the sagging amount detection sensor; a second memory unit receiving and storing the operation control signal for the link member actuator; a big data storage unit storing a database of present sagging amount of the plastic sheet-operation control signal history information as big data by receiving the present sagging amount of the plastic sheet temporarily stored in the first memory unit, and the operation control signal stored in the second memory unit, and generating the present sagging amount-operation control signal history information accumulated in chronological order by interlocking the present sagging amount of the plastic sheet and the operation control signal to each other at the same time; a big data analysis unit analyzing the big data of the present sagging amount-operation control signal history information stored in the big data storage unit, and generating an optimal operation control signal for the link member actuator in response to the present sagging amount of the plastic sheet; and an actuator control unit receiving the optimal operation control signal from the big data analysis unit, generating the operation control signal for the link member actuator, and transmitting the operation control signal to the link member actuator.

According to the plastic sheet supplying apparatus for a thermoforming machine having an adjustable pin of the present invention, in the process that a plastic sheet adhering to a material of a door trim or the instrument panel is heated, fixing pins supporting the lower portions of the edge portions of the plastic sheet are configured to have adjustable positions to be moved to the outside in response to the sagging of the plastic sheet or the change of the size thereof caused by heating, so that the entire portion of the plastic sheet maintains a flat state without sagging, whereby the plastic sheet is uniformly heated and the entire portion thereof is uniformly stretched. Accordingly, the quality of a molded product is improved, and fabric consumption is reduced. Furthermore, the present invention has the structure in which the position adjustable pin fixing unit is arranged at the lower portion of the plastic sheet, and a clamp unit in the loading step or a clamp unit in the molding step is arranged at the upper portion of the plastic sheet, so in the process of clamping and transferring the plastic sheet, interference between components is prevented, thereby increasing the driving stability and efficiency of the apparatus, and improving durability of the apparatus and reducing manufacturing cost thereof due to the simplified configuration.

DETAILED DESCRIPTION OF THE INVENTION

Hereinafter, an embodiment of the present invention will be described in detail with reference to FIGS. 1 to 9. Meanwhile, in a material of a door trim or an instrument panel, a plastic sheet, a thermoforming machine, a plastic sheet supplying apparatus for a thermoforming machine, a clamp, a heater, a link member, a sagging amount detection sensor of the accompanying drawings and detailed description, which are normally used, drawings and description for the configuration and operation thereof easily understood by those skilled in the art have been simplified or omitted. Particularly, in the illustrations and detailed description of the drawings, the detailed descriptions and illustrations of the detailed technical configurations and operation of elements that are not directly related to the technical features of the present invention are omitted, and only technical configurations related to the present invention are briefly illustrated or described.

Figure 1:
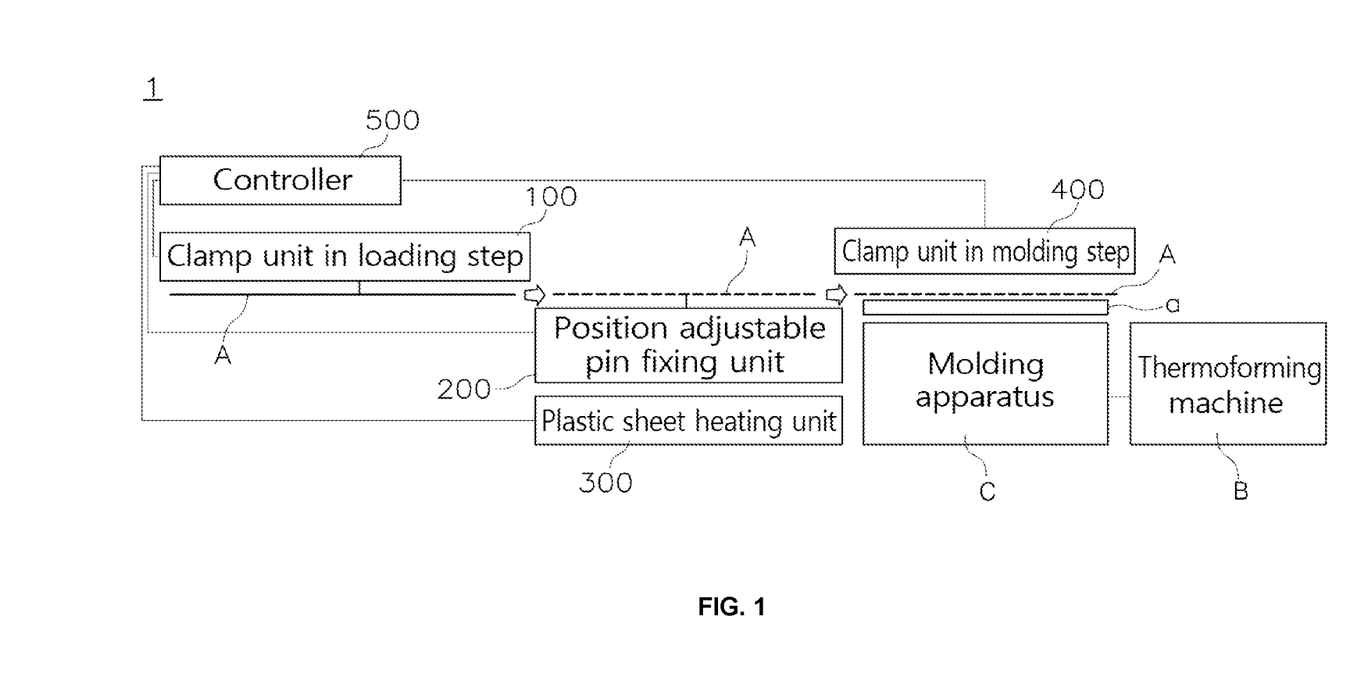
FIG. 1 is a block diagram showing the basic configuration of a plastic sheet supplying apparatus for a thermoforming machine having an adjustable pin according to the present invention.

The present invention relates to the plastic sheet supplying apparatus 1 for a thermoforming machine for adhering a plastic sheet A to a material a of a door trim, an instrument panel, a dashboard, or headliner, etc. for a vehicle, and is configured to include a clamp unit 100 in a loading step, a position adjustable pin fixing unit 200, a plastic sheet heating unit 300, a clamp unit 400 in a molding step, and a controller 500 as described in FIG. 1.

Figure 2:
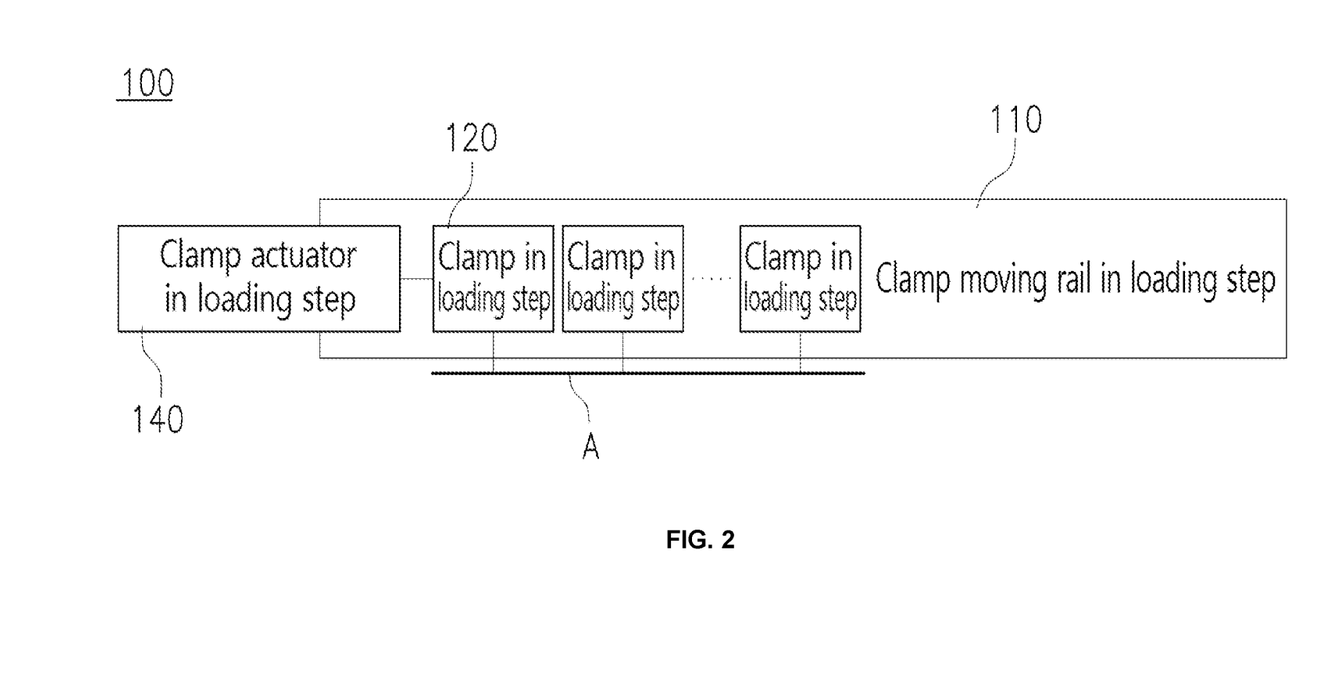
FIG. 2 is a block diagram showing the configuration of a clamp unit in a loading step according to an embodiment of the present invention.
Figure 3:
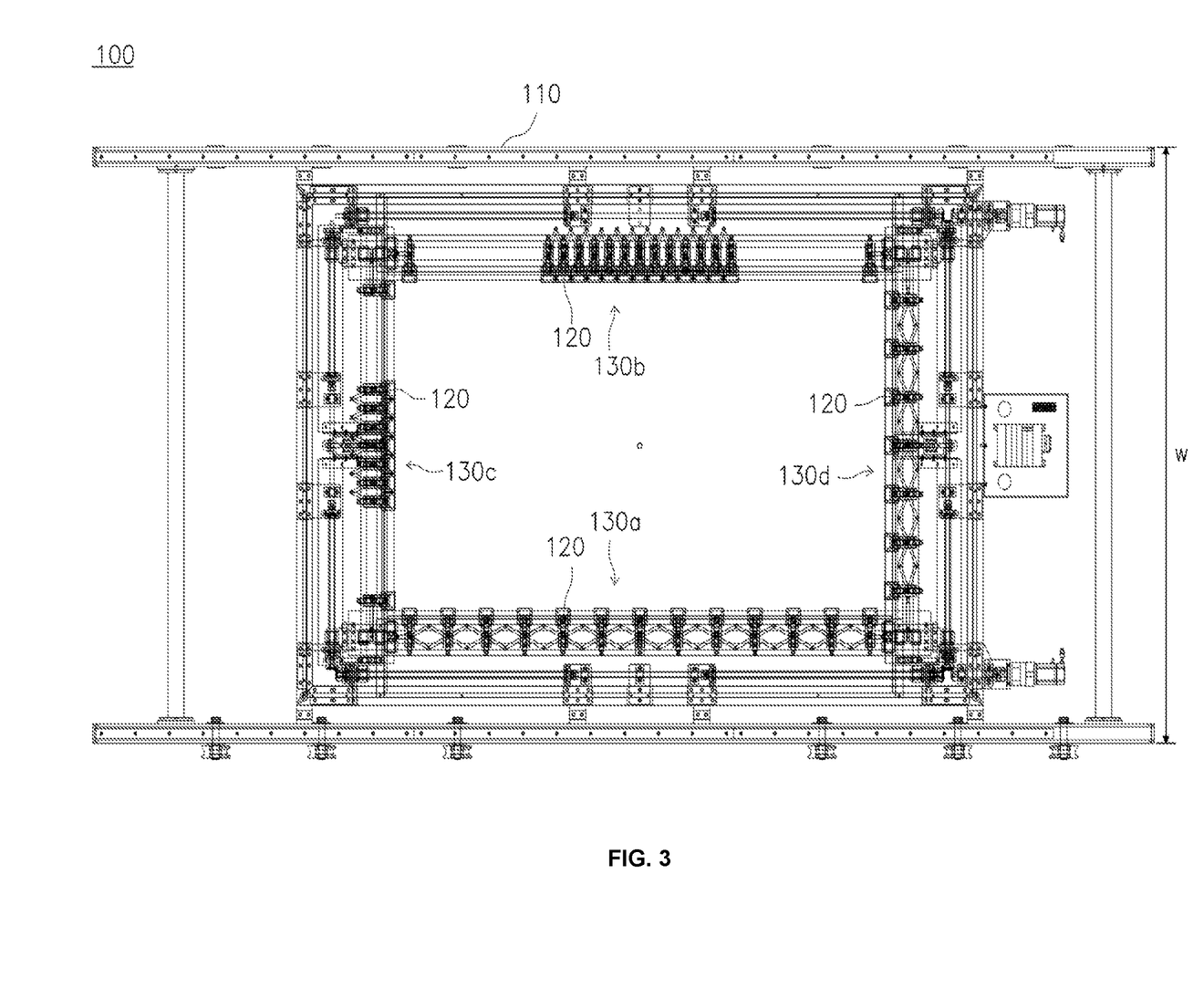
FIG. 3 is a top plan view of the clamp unit in the loading step according to the embodiment of the present invention.

The clamp unit 100 in the loading step is a device that holds the plastic sheet A by clamping the plastic sheet A in a horizontal arrangement according to a first clamping signal; moves the plastic sheet A forward by a predetermined distance by moving forward according to a first forward movement signal; unclamps the plastic sheet A according to a first unclamping signal; and is restored to an initial position thereof by moving rearward according to a first rearward movement signal. To this end, the clamp unit 100 in the loading step may be configured to include a clamp moving rail 110 in the loading step, clamps 120 in the loading step, and a clamp actuator in the loading step as illustrated in FIGS. 2 and 3.

The clamp moving rail 110 in the loading step is installed at areas of positions at which the clamp unit 100 in the loading step and the position adjustable pin fixing unit 200 are arranged, and induces the movements of the clamps 120 in the loading step. The clamp unit 100 in the loading step allows a pair of clamp moving rails 110 in the loading step to be arranged to be parallel to each other at left and right sides of width directions w of the clamp unit 100

The clamps 120 in the loading step are movably mounted to the clamp moving rail 110 in the loading step. The clamp unit 100 in the loading step allows two left-and-right-column clamp lines 130a and 130b in the loading step to be formed on the edge portions of the plastic sheet A located at left and right sides of width directions thereof, each of the left-and-right-column clamp lines having a structure in which the preset number of the clamps 120 in the loading step is linearly arranged, or allows two front-and-rear-row clamp lines 130c and 130d in the loading step to be formed on the edge portions of the plastic sheet A located at front and rear sides of longitudinal directions thereof, each of the front-and-rear-row clamp lines having a structure in which the preset number of the clamps 120 in the loading step is linearly arranged. Furthermore, the clamp unit 100 in the loading step allows the two left-and-right-column clamp lines 130a and 130b in the loading step and the two front-and-rear-row clamp lines 130c and 130d in the loading step to form a rectangular frame.

The clamp actuator 140 in the loading step is an actuator which allows the clamps 120 in the loading step to move forward and rearward along the clamp moving rail 110 in the loading step.

Figure 4A:
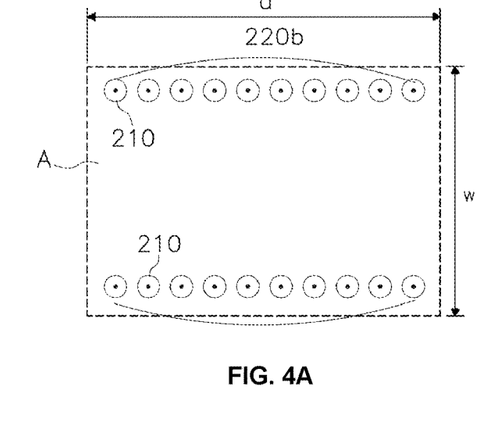
FIGS. 4A to 4C are views illustrating the configurations of fixing pins arranged in a position adjustable pin fixing unit according to the embodiment of the present invention.
Figure 4B:
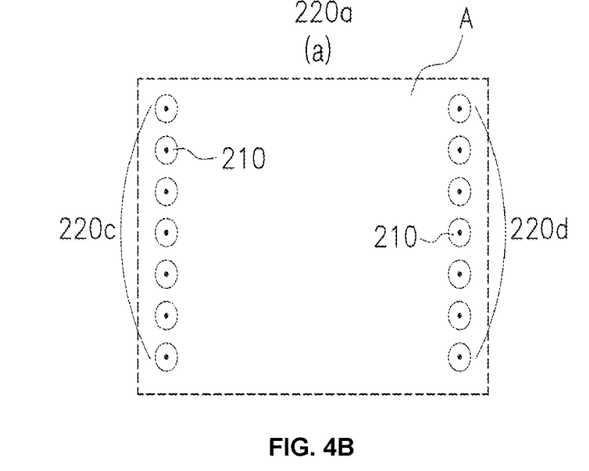
Figure 4C:
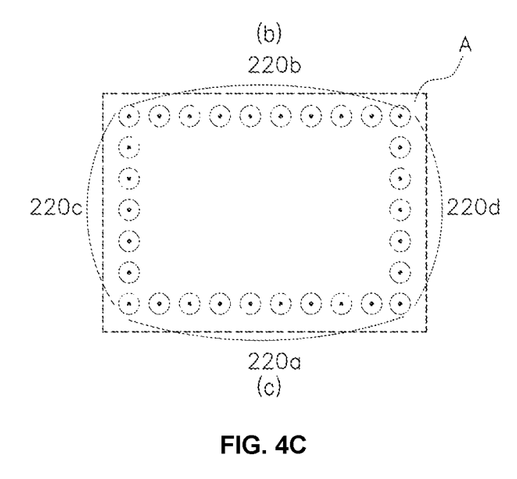

The position adjustable pin fixing unit 200 is configured to include a plurality of fixing pins 210 arranged perpendicularly to the edge portions of the plastic sheet A, and supports the plastic sheet A at a lower side thereof received from the clamp unit 100 in the loading step to fix the plastic sheet A in the state of a horizontal arrangement. Particularly, the position adjustable pin fixing unit 200 allows each of the fixing pins 210 to be moved to the outside in response to the sagging of the plastic sheet A or the change of the size thereof caused by heating. Accordingly, as the plastic sheet A is pulled, the entire portion of the plastic sheet maintains a flat state without sagging, whereby the plastic sheet is uniformly heated and the entire portion thereof is uniformly stretched. Accordingly, the quality of a molded product of the thermoforming machine is improved, and fabric consumption is reduced. To this end, as illustrated in FIG. 4A, the position adjustable pin fixing unit 200 according to the embodiment of the present invention allows two left-and-right-column fixing pin lines 220a and 220b to be formed on edge portions of the plastic sheet A located at left and right sides of width directions w thereof, each of the left-and-right-column fixing pin lines having a structure in which the preset number of the fixing pins 210 is linearly arranged, or as illustrated in FIG. 4B, allows two front-and-rear-row fixing pin lines 220c and 220d to be formed on the edge portions of the plastic sheet A located at front and rear sides of longitudinal directions d thereof, each of the front-and-rear-row fixing pin lines having a structure in which the preset number of the fixing pins 210 is linearly arranged. Furthermore, as illustrated in FIG. 4C, the position adjustable pin fixing unit 200 may include the two left-and-right-column fixing pin lines 220a and 220b and the two front-and-rear-row fixing pin lines 220c and 220d.

Figure 5:
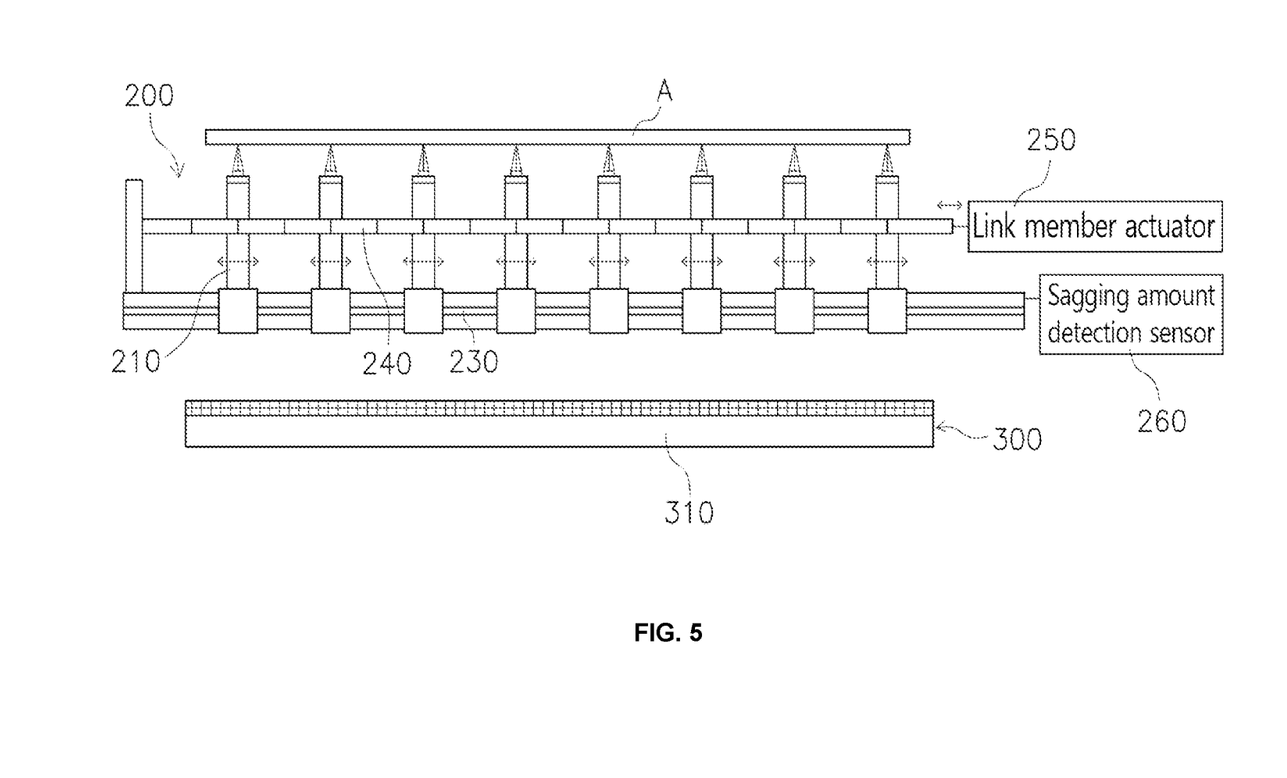
FIG. 5 is a view illustrating the configuration of the position adjustable pin fixing unit according to the embodiment of the present invention.

Here, the position adjustable pin fixing unit 200 according to the embodiment of the present invention is configured to include a guide rail 230, the link member 240, a link member actuator 250, and the sagging amount detection sensor 260 as illustrated in FIG. 5.

The guide rail 230 is a rail to which the lower end portion of each of the fixing pins 210 is movably mounted. A pair of guide rails 230 corresponding to the fixing pin lines 220a and 220b may be formed, and a pair of guide rails 230 corresponding to the fixing pin lines 220c and 220d may be formed.

Figure 6:
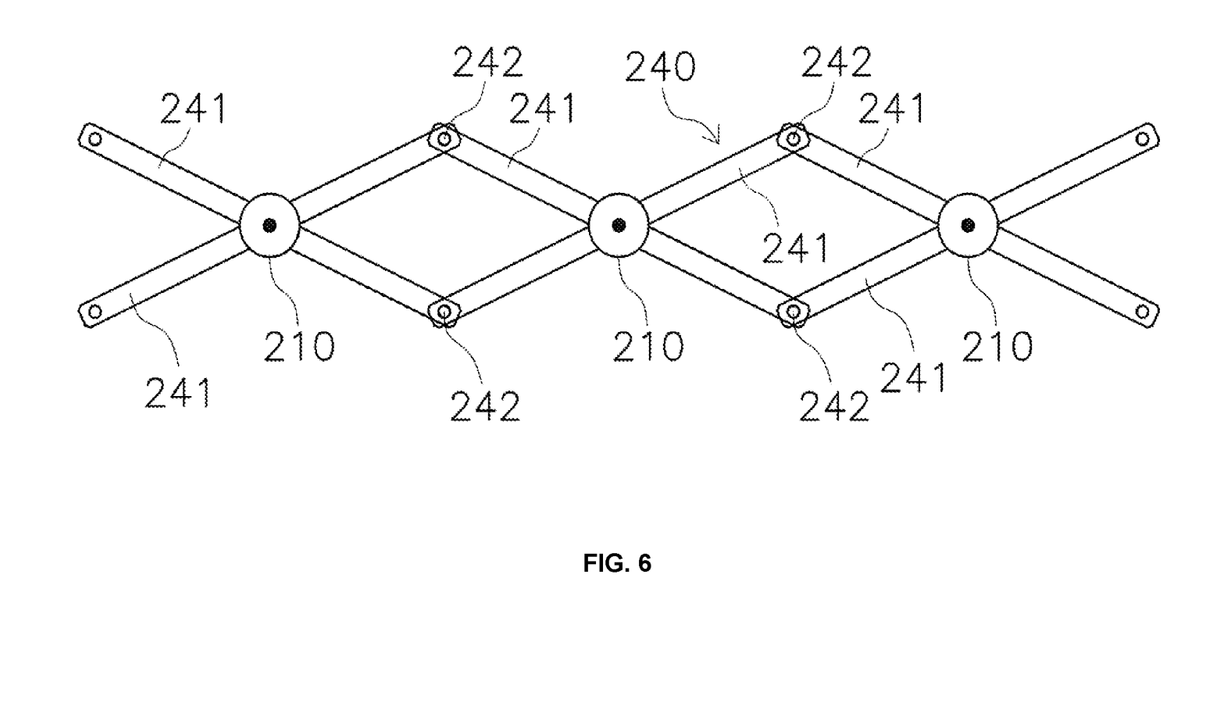
FIG. 6 is a view illustrating a link member of the position adjustable pin fixing unit according to the embodiment of the present invention.

As illustrated in FIG. 6, the link member 240 has a structure in which multiple sticks 241 are coupled to each other by hinges 242, wherein each of the fixing pins 210 is fixed to a portion at which the sticks 241 cross each other in an X shape. In relation to the detailed configuration of such a link member 240, the configuration of a horizontal link member and a vertical link member disclosed in Korean Patent No. 10-1334869 titled "Apparatus of transferring skin cover for thermoforming machine with adjustable clamp", which is applied by the applicant of the present invention, can be seen as a reference.

The link member actuator 250 is an actuator which induces the link movement of the link member 240 and increases distance between the fixing pins 210 in response to the sagging of the plastic sheet A or the change of the size thereof caused by heating.

Meanwhile, the position adjustable pin fixing unit 200 according to the embodiment of the present invention includes the sagging amount detection sensor 260 detecting the present sagging amount of the plastic sheet A as illustrated in FIG. 5. The sagging amount detection sensor 260 transmits the value of the present sagging amount of the plastic sheet to the controller 500 in real time.

The plastic sheet heating unit 300 is arranged at a preset position, and heats the plastic sheet A fixed to the position adjustable pin fixing unit 200. Such a plastic sheet heating unit 300 may be configured as a plate-shaped heater 310 arranged horizontally at the lower side of the plastic sheet A fixed to the position adjustable pin fixing unit 200 as illustrated in FIG. 5.

Figure 7:
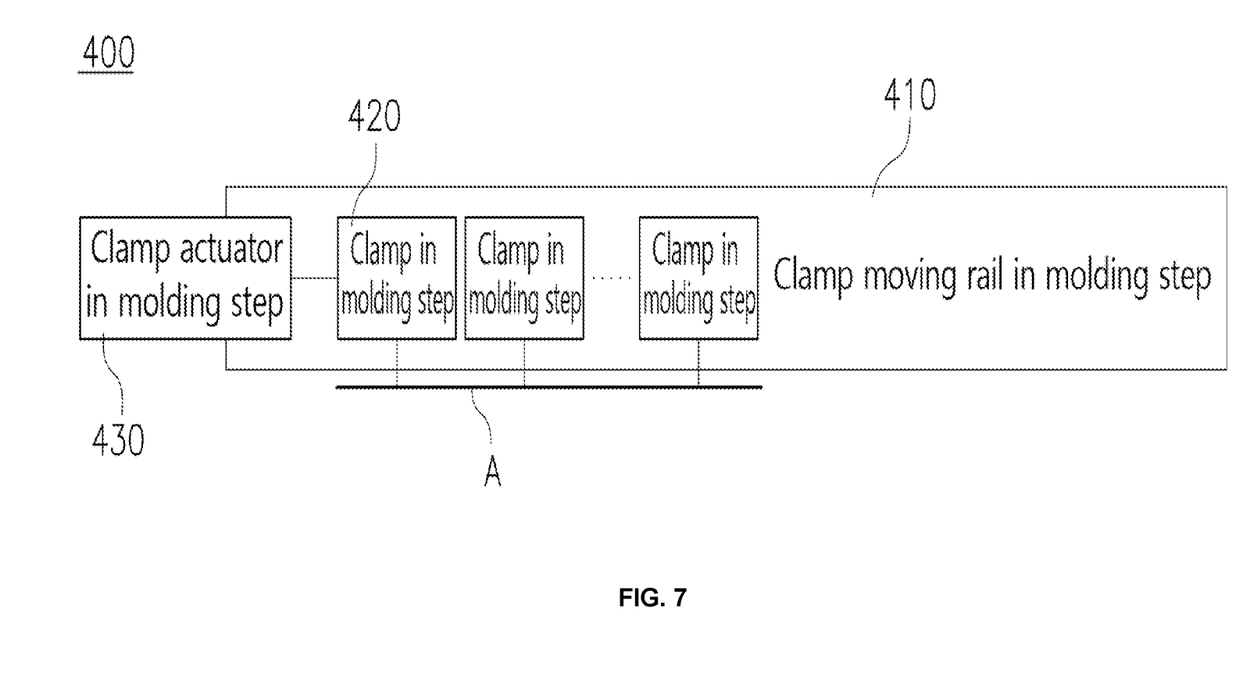
FIG. 7 is a block diagram illustrating the configuration of a clamp unit in a molding step according to the embodiment of the present invention.
Figure 8:
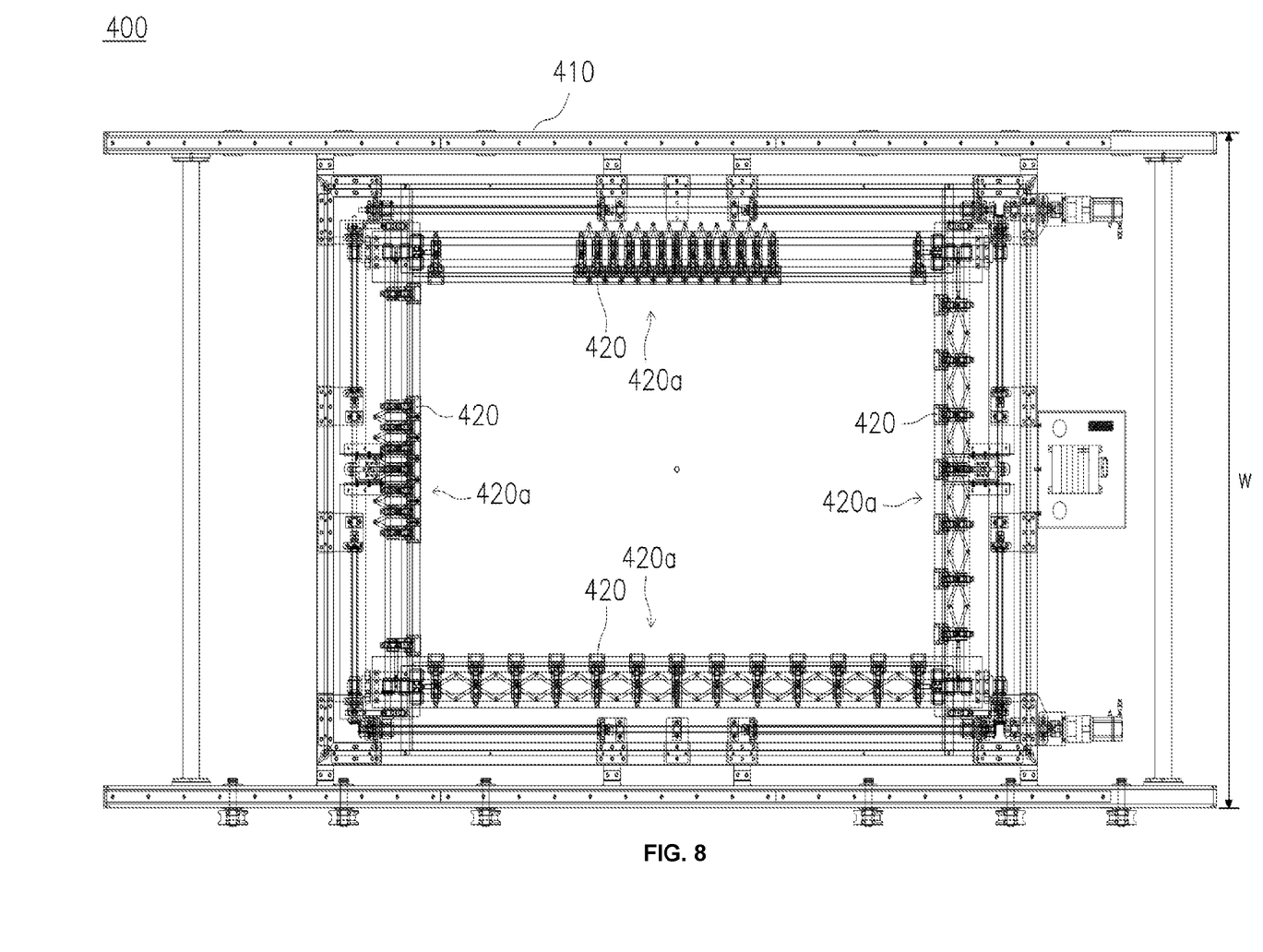
FIG. 8 is a top plan view of the clamp unit in the molding step according to the embodiment of the present invention.

The clamp unit 400 is a device which moves the plastic sheet A forward by a predetermined distance by moving forward according to a second forward movement signal, and transfers the plastic sheet A to a molding apparatus C of the thermoforming machine B after moving rearward and clamping the plastic sheet A fixed to the position adjustable pin fixing unit 200 according to a second rearward movement signal and a second clamping signal. To this end, the clamp unit 400 in the molding step may be configured to include a clamp moving rail 410 in the molding step, clamps 420 in the molding step, and a clamp actuator 430 in the molding step as illustrated in FIGS. 7 and 8.

The clamp moving rail 410 in the molding step is installed at areas of positions at which the clamp unit 400 in the molding step and the position adjustable pin fixing unit 200 are arranged, and induces the movements of the clamps 420 in the molding step. The clamp unit 400 in the molding step allows a pair of clamp moving rails 410 in the molding step to be arranged to be parallel to each other at the left and right sides of width directions w of the clamp unit 400.

The clamps 420 in the molding step are movably mounted to the clamp moving rail 410 in the molding step. The clamp unit 400 in the molding step allows two left-and-right-column clamp lines 420a and 420b in the molding step to be formed on the edge portions of the plastic sheet A located at left and right sides of width directions thereof, each of the clamp lines 420a and 420b having a structure in which the preset number of the clamps 420 in the molding step is linearly arranged, or allows two front-and-rear-row clamp lines 420c and 420d in the molding step to be formed on the edge portions of the plastic sheet A located at front and rear sides of longitudinal directions thereof, each of the clamp lines 420c and 420d having a structure in which the preset number of the clamps 420 in the molding step is linearly arranged. Furthermore, the clamp unit 400 in the molding step allows the two left-and-right-column clamp lines 420a and 420b in the molding step and the two front-and-rear-row clamp lines 420c and 420d in the molding step to form a rectangular frame.

The clamp actuator 430 in the molding step is an actuator which allows the clamps 420 in the molding step to move forward and rearward along the clamp moving rail 410 in the molding step.

Figure 9:
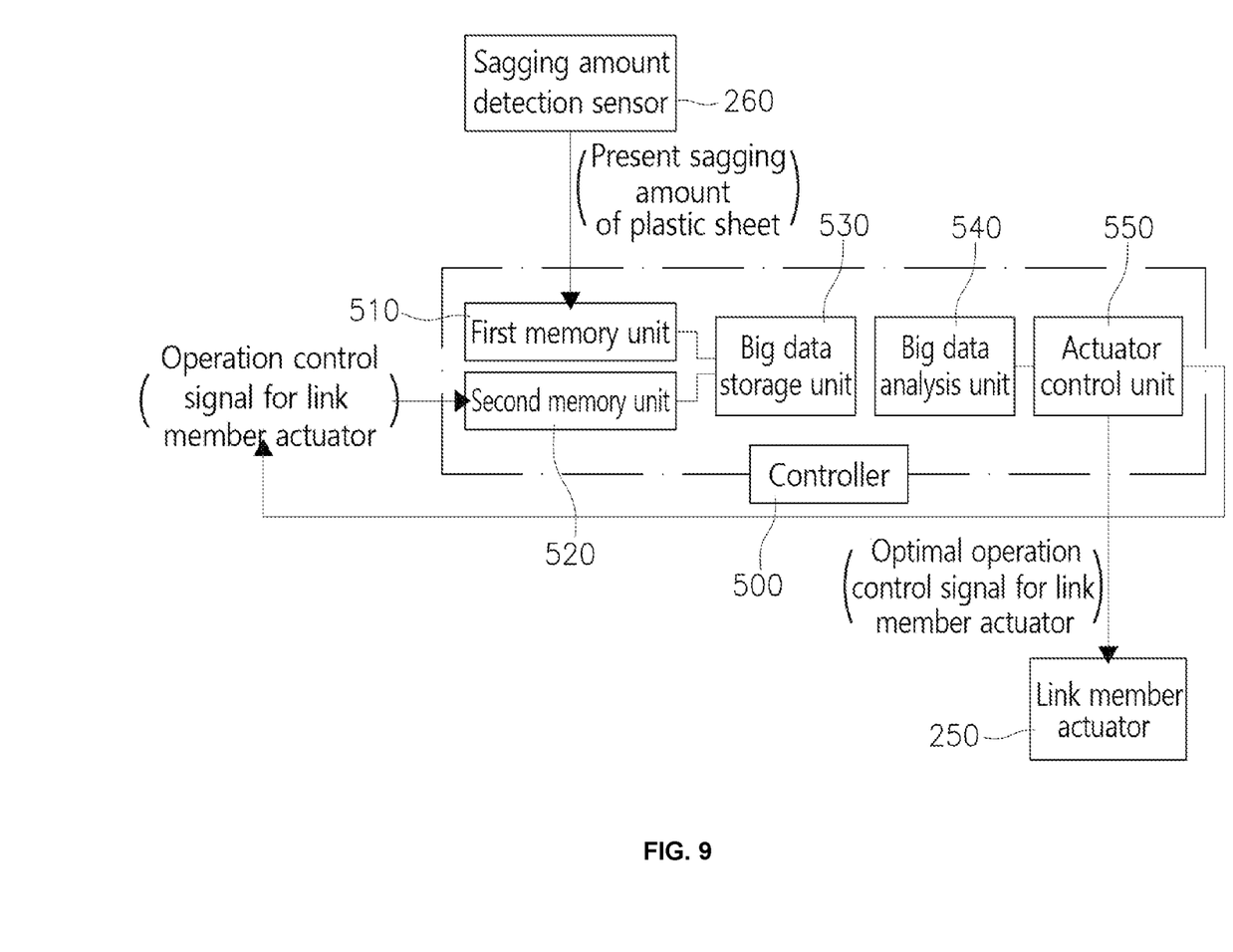
FIG. 9 is a block diagram illustrating the configuration of a controller according to the embodiment of the present invention.

The controller 500 controls the operations of the clamp unit 100 in the loading step, the position adjustable pin fixing unit 200, the plastic sheet heating unit 300, and the clamp unit 400 in the molding step. Here, the controller 500 according to the embodiment of the present invention is configured to include a first memory unit 510, a second memory unit 520, a big data storage unit 530, a big data analysis unit 540, and an actuator control unit 550 as illustrated in FIG. 9.

The first memory unit 510 is a unit which temporarily stores the present sagging amount of the plastic sheet by receiving the present sagging amount from the sagging amount detection sensor 260, and the second memory unit 520 is a unit which receives and stores the operation control signal for the link member actuator 250.

The big data storage unit 530 receives the present sagging amount of the plastic sheet temporarily stored in the first memory unit 510, and the operation control signal stored in the second memory unit 520, and generates present sagging amount of the plastic sheet-operation control signal history information accumulated in chronological order by interlocking the present sagging amount of the plastic sheet and the operation control signal to each other at the same time, and stores a database of the history information as big data.

The big data analysis unit 540 analyzes the big data of the present sagging amount-operation control signal history information stored in the big data storage unit 530, and generates an optimal operation control signal for the link member actuator 250 in response to the present sagging amount of the plastic sheet. The existing operation control signal of the controller 500 is replaced with the optimal operation control signal generated in such a way. Such a big data analysis unit 540 can generate the optimal operation control signal through the process of evaluating the adequacy of the operation control signal at an immediately preceding point by a difference value between the present sagging amount of the plastic sheet at the immediately preceding time and the present sagging amount of the plastic sheet at the next time.

The actuator control unit 550 receives the optimal operation control signal from the big data analysis unit 540; generates the operation control signal for the link member actuator 250; and transmits the operation control signal to the link member actuator 250.

In the plastic sheet supplying apparatus 1 for a thermoforming machine having an adjustable pin according to the embodiment of the present invention, which has the above-described configuration, the fixing pins 210 supporting the plastic sheet A at the lower side thereof and fixing the plastic sheet A in the state of the horizontal arrangement are moved in response to the change of the size of the plastic sheet A caused by heating. Accordingly, the entire portion of the plastic sheet A is uniformly heated and is uniformly stretched without wrinkling, so the quality of a molded product is improved, and fabric consumption is reduced. Furthermore, the plastic sheet supplying apparatus 1 for a thermoforming machine having an adjustable pin according to the embodiment of the present invention has the structure in which the position adjustable pin fixing unit 200 is arranged at the lower portion of the plastic sheet A, and the clamp unit 100 in the loading step or the clamp unit 400 in the molding step are arranged at the upper portions of the plastic sheet A. Accordingly, in the process of clamping and transferring the plastic sheet A, interference between components is prevented from occurring, so the driving stability and efficiency of the apparatus is increased. Furthermore, the configuration of the apparatus is simplified, so durability thereof is improved, and manufacturing cost thereof is decreased.

Although the plastic sheet supplying apparatus for a thermoforming machine having an adjustable pin according to the embodiment of the present invention has been described with reference to the accompanying drawings as described above, this is merely an example, and those skilled in the art will appreciate that various changes and modifications are possible without departing from the technical spirit of the present invention.

What is claimed is:
1. A plastic sheet supplying apparatus for a thermoforming machine, which is adapted to adhere a plastic sheet to a base member, the apparatus comprising:
a clamp unit in a loading step;
a clamp unit in a molding step;
a position adjustable pin fixing unit having a plurality of fixing pins arranged linearly to edge portions of a plastic sheet, each of the fixing pins supporting the plastic sheet received from an outside to fix the plastic sheet in horizontal arrangement, the fixing pins adapted to be moved with respect to one another in response to a degree of sagging or size change of the plastic sheet caused by heating of the plastic sheet;
a plastic sheet heating unit arranged at a preset position, and heating the plastic sheet fixed to the position adjustable pin fixing unit; and
a controller controlling operations of the position adjustable pin fixing unit and the plastic sheet heating unit,
wherein the plurality of fixing pins are arranged at a lower side of the plastic sheet to support from the lower side of the plastic sheet, and the clamp unit in the loading step and the clamp unit in the molding step are arranged at an upper side of the plastic sheet, respectively, such that interferences between the fixing pins, the clamp unit in the loading step and the clamp unit in the molding step are prevented from occurring in a process of clamping and transferring the plastic sheet.

2. The apparatus of claim 1, wherein the position adjustable pin fixing unit comprises two left-and-right-column fixing pin lines on edge portions of the plastic sheet located at left and right sides of the plastic sheet, each of the left-and-right-column fixing pin lines having a structure in which the preset number of the fixing pins are linearly arranged.

3. The apparatus of claim 1, wherein the position adjustable pin fixing unit comprises two front-and-rear-row fixing pin lines on edge portions of the plastic sheet located at front and rear sides of the plastic sheet, each of the front-and-rear-row fixing pin lines having a structure in which the preset number of the fixing pins are linearly arranged.

4. The apparatus of claim 1, wherein the position adjustable pin fixing unit comprises:
- a link member having a structure in which multiple arms are coupled to each other by hinges, each of the fixing pins being fixed to a portion at which the arms cross each other in an X shape, and
- a link member actuator for inducing a link movement of the link member and changing a distance between the fixing pins in response to the degree of sagging or size change of the plastic sheet caused by the heating of the plastic sheet,
- wherein the controller generates an operation control signal for the link member actuator in response to the degree of sagging or size change of the plastic sheet, and controls an operation of the link member actuator.

5. The apparatus of claim 4, wherein the position adjustable pin fixing unit further comprises a sagging amount detection sensor detecting a present sagging amount or degree of the plastic sheet, and the controller comprises:
- a first memory unit temporarily storing the present sagging amount or degree of the plastic sheet by receiving the present sagging amount or degree thereof from the sagging amount detection sensor;
- a second memory unit receiving and storing the operation control signal for the link member actuator;
- a big data storage unit storing a database of present sagging amount or degree of the plastic sheet-operation control signal history information as big data by receiving the present sagging amount/degree of the plastic sheet temporarily stored in the first memory unit, and the operation control signal stored in the second memory unit, and generating the present sagging amount/degree operation control signal history information accumulated in chronological order by interlocking the present sagging amount/degree of the plastic sheet and the operation control signal to each other at the same time;
- a big data analysis unit analyzing the big data of the present sagging amount/degree operation control signal history information stored in the big data storage unit, and generating an optimal operation control signal for the link member actuator in response to the present sagging amount/degree of the plastic sheet; and
- an actuator control unit receiving the optimal operation control signal from the big data analysis unit, generating the operation control signal for the link member actuator, and transmitting the operation control signal to the link member actuator.

* * * * *